(12) United States Patent
Huber et al.

(10) Patent No.: US 11,407,437 B2
(45) Date of Patent: Aug. 9, 2022

(54) GEAR WHEEL OF AN ADJUSTMENT DRIVE MECHANISM FOR A STEERING COLUMN AND STEERING COLUMN FOR A MOTOR VEHICLE

(71) Applicants: thyssenkrupp Presta AG, Eschen (LI); thyssenkrupp AG, Essen (DE)

(72) Inventors: Sebastian Huber, Göfis (AT); Jean-Pierre Specht, Haag (CH); Arne Schacht, Feldkirch (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 17/258,696

(22) PCT Filed: Jul. 22, 2019

(86) PCT No.: PCT/EP2019/069701
§ 371 (c)(1),
(2) Date: Jan. 7, 2021

(87) PCT Pub. No.: WO2020/020835
PCT Pub. Date: Jan. 30, 2020

(65) Prior Publication Data
US 2021/0129888 A1 May 6, 2021

(30) Foreign Application Priority Data
Jul. 23, 2018 (DE) .................... 10 2018 212 202.4

(51) Int. Cl.
*B62D 1/181* (2006.01)
*B62D 1/19* (2006.01)
*F16H 1/16* (2006.01)

(52) U.S. Cl.
CPC ............. *B62D 1/181* (2013.01); *B62D 1/195* (2013.01); *F16H 1/16* (2013.01)

(58) Field of Classification Search
CPC ........... B62D 1/181; B62D 1/195; F16H 1/16; F16H 2025/209; F16H 25/24
See application file for complete search history.

(56) References Cited

U.S. PATENT DOCUMENTS

| 4,900,059 A | 2/1990 | Kinoshita |
| 4,967,618 A | 11/1990 | Matsumoto |

(Continued)

FOREIGN PATENT DOCUMENTS

| CN | 105189253 A | 12/2015 | |
| CN | 112384429 A * | 2/2021 | ............ F16C 25/083 |

(Continued)

OTHER PUBLICATIONS

English Translation of International Search Report issued in PCT/EP2019/069701, dated Oct. 23, 2019.

(Continued)

*Primary Examiner* — Drew J Brown
(74) *Attorney, Agent, or Firm* — thyssenkrupp North America, LLC (57) ABSTRACT

A gear wheel for an adjustment drive mechanism which has a ring gear which is attached coaxially circumferentially to the outside of a core element which has an axial passage opening, in which a threaded element is fitted, the latter having an axially continuous internal thread having at least one thread tooth running around helically. The threaded element is formed from a plastic as an injection molded plastic part, which is molded onto the core element on an inner wall of the passage opening.

20 Claims, 4 Drawing Sheets

(56) References Cited

U.S. PATENT DOCUMENTS

| | | | |
|---|---|---|---|
| 10,421,475 B2 * | 9/2019 | Derocher | B62D 1/183 |
| 10,654,509 B2 * | 5/2020 | Huber | B62D 1/185 |
| 10,974,756 B2 * | 4/2021 | Cana | B62D 1/184 |
| 11,091,188 B2 * | 8/2021 | Specht | F16C 19/183 |
| 2017/0015346 A1 | 1/2017 | Johta et al. | |

FOREIGN PATENT DOCUMENTS

| | | | | |
|---|---|---|---|---|
| DE | 38 86 900 T | 4/1994 | | |
| DE | 10 2010 001 844 A | 8/2011 | | |
| DE | 10 2012 200 834 A | 7/2013 | | |
| DE | 10 2014 101 995 A | 1/2015 | | |
| DE | 10 2015 215 428 A | 2/2017 | | |
| DE | 102018211493 A1 * | 1/2020 | | F16C 33/588 |
| DE | 102018212202 A1 * | 1/2020 | | F16H 1/16 |
| DE | 102020204473 A1 * | 10/2021 | | F16H 25/2021 |
| EP | 0 315 823 A | 5/1989 | | |
| EP | 1710470 A2 * | 10/2006 | | F16H 55/17 |
| WO | 2013/107617 A | 7/2013 | | |

OTHER PUBLICATIONS

DIN2244:1977-01, "Screw threads—Terms and screw thread elements for parallel screw threads", (May 2002), pp. 1-35.

\* cited by examiner

GEAR WHEEL OF AN ADJUSTMENT DRIVE MECHANISM FOR A STEERING COLUMN AND STEERING COLUMN FOR A MOTOR VEHICLE

CROSS REFERENCE TO RELATED APPLICATIONS

This application is a U.S. National Stage Entry of International Patent Application Serial Number PCT/EP2019/069701, filed Jul. 22, 2019, which claims priority to German Patent Application No. DE 10 2018 212 202.4, filed Jul. 23, 2018, the entire contents of both of which are incorporated herein by reference.

FIELD

The present disclosure generally relates to a gear wheel for an adjustment drive mechanism which has a ring gear.

BACKGROUND

Steering columns for motor vehicles have a steering shaft with a steering spindle, a steering wheel for introducing a steering command by the driver being attached to the rear end thereof facing the driver in the direction of travel. The steering spindle is rotatably mounted about its longitudinal axis in a casing tube of an actuating unit which is retained by a support unit on the vehicle body. As the actuating unit has at least one casing tube which is displaceable in a telescopic manner in the direction of the longitudinal axis in a casing unit, which is connected to the support unit and which is also denoted as a guide box or boxed swing arm, a longitudinal adjustment of the steering wheel relative to the vehicle body may be carried out. A vertical adjustment may be implemented by the actuating unit or a casing unit receiving this actuating unit being pivotably mounted on the support unit. The adjustment of the actuating unit in the longitudinal and/or vertical direction permits the setting of an ergonomically comfortable steering wheel position relative to the driver position in the operating position, also denoted as the driving or operating position, in which a manual steering operation may be carried out.

In the case of motor-adjustable steering columns, it is known to provide a motorized adjustment drive mechanism with a drive unit for the adjustment, said drive unit comprising an electrical drive motor which drives a spindle drive with a threaded spindle screwed into an internal thread of a spindle nut. By means of the drive unit, the threaded spindle and the spindle nut are rotatably drivable relative to one another about the threaded spindle axis, or in short the spindle axis, whereby depending on the rotational direction the threaded spindle and the spindle nut may be moved in a translational manner toward one another or away from one another in the direction of the threaded spindle axis. The threaded spindle and the spindle nut are supported in the direction of the spindle axis on parts of the steering column which are adjustable relative to one another, for example on a casing unit and a support unit or on casing tubes of a casing unit which are telescopable in the axial direction.

The drive of the spindle drive is carried out by the drive unit via a gear wheel which is rotatably drivable about its axis, which is identical to the threaded spindle axis, and which is coupled to the spindle nut in a rotationally fixed manner. In the generic design forming the basis of the invention, the internal thread of the spindle nut is integrated in the gear wheel.

A generic gear wheel has a core element which bears a ring gear on the outside and forms, for example, a worm gear with a toothing into which a worm which is drivable by a drive motor engages in order to form a reduction gear. The internal thread may be configured in the core element as disclosed, for example, in U.S. Pat. No. 4,967,618. Alternatively, it is known that a core element consisting of metal has the ring gear on the outside and an axial passage opening on the inside, into which a threaded bushing is inserted as a threaded element, as disclosed for example in DE 38 86 900 T2. A drawback here is that this known threaded element first has to be manufactured separately as a separate component and then has to be joined and fixed to the core element. The required dimensionally accurate fit requires a correspondingly high degree of manufacturing effort. The assembly in the core element, in which a deformation or faulty alignment of the threaded element has to be avoided as far as possible, and the fixing by a material and/or positive connection, results in additional assembly effort. The load-bearing capacity and durability of the gear wheel may also be impaired by the joint.

Thus, a need exists for an improved gear wheel which requires less manufacturing and assembly effort and has a greater load-bearing capacity and durability.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a gear wheel for an adjustment drive mechanism which has a ring gear, which is attached coaxially circumferentially to the outside of a core element, which has an axial passage opening, in which a threaded element is fitted, the latter having an axially continuous internal thread having at least one thread tooth running around helically. An adjustment drive mechanism with a gear wheel and a steering column for a motor vehicle having an adjustment drive mechanism are also the subject of the invention.

The terms used for denoting the internal thread are in line with DIN 2244. In particular, the thread tooth is understood as the part of the thread which is filled with material and defined by helical surfaces inclined toward one another, and the thread space and/or thread groove is understood as the part of the thread which is free of material and defined by helical surfaces inclined toward one another.

According to the invention, in a generic gear wheel the threaded element is formed from a plastic as an injection molded plastic part, which is molded onto the core element on an inner wall of the passage opening.

By means of the injection-molding in the plastics injection-molding method, it is possible to shape the threaded element including the internal thread in a dimensionally accurate manner in one manufacturing step of an integrated production method and at the same time to produce a particularly durable joint with the core element by means of a material connection and optionally a positive connection. As a result, the manufacturing and assembly effort is reduced relative to the prior art and at the same time the durability and load-bearing capacity may be increased.

According to the invention, the threaded element is injection-molded into the core element. To this end, the core element is provided and positioned in an injection mold of a plastics injection-molding machine. The molten plastic is injected into a mold cavity between a threaded core of the injection mold and the inner wall of the passage opening. As a result, a material connection of the plastic with the inner wall is produced. After the plastic has solidified, the threaded core is removed from the mold and the internal thread of the threaded element formed from the plastic is positioned and oriented exactly coaxially in the core element. The further manufacturing and assembly steps required in the prior art may be dispensed with. As a result, the manufacturing and assembly effort is reduced.

Additionally surface structures, protuberances, depressions or similar positive connection elements may be configured in the inner wall so that additionally a non-releasable positive connection is generated between the plastic of the threaded element and the core element. For example, a targeted roughening of the surface of regions of the inner wall may also be carried out in order to optimize the adhesive action.

It is advantageous that the passage opening has at least one smooth, cylindrical positioning portion. The positioning portion, also denoted as the movement region, extends over a partial axial portion of the passage opening. The inner wall is configured at that point as a smooth, coaxial internal cylinder. The uniform internal diameter in the positioning portion is larger than the external diameter of the internal thread. As a result, the wall thickness of the threaded element, measured radially between the diameter of the internal thread and the inner wall, is uniform in the circumferential direction and over the length of the positioning portion. By the smooth inner wall it is ensured that in the injection-molding process no irregular sink marks of the injection molded plastic part occur during the cooling process, whereby the internal thread of the threaded element in the region of the positioning portion is shaped so as to dimensionally accurate. Moreover, potentially harmful stresses due to shrinkage during solidification are substantially avoided.

It may be provided that an undercut connecting portion is configured in the passage opening. Such a connecting portion may be configured, for example, in the form of an at least partially circumferential groove-shaped recess integrally formed radially from the inside in the passage opening. As the internal diameter in the connecting portion is larger than in the remaining portions, in particular the positioning portion, by means of the plastics material injected into the connecting portion a positive connection element which is effective in the axial direction is formed between the core element and the threaded element. This ensures that, after the solidification of the plastics, the threaded element is fixed by a material and positive connection in the passage opening and is connected to the core element. Preferably, the connecting portion may also have a smooth, cylindrical inner wall, whereby potentially damaging deformations or stresses due to sink marks or distortion during solidification may be substantially avoided.

Preferably, a connecting portion is arranged at a distance from the front face of the core element and adjoins a positioning portion via a circumferential step protruding radially inwardly.

A development provides that a crash support portion is configured in the passage opening, at least one support element protruding from the core element into a thread tooth in said crash support portion. The support element is preferably integrally configured with the core element which preferably consists of a material, preferably of steel, which is able to withstand mechanical loads. As a result, the at least one circumferential thread tooth of the internal thread is at least partially formed by the core element. The support element forms to a certain extent a thread tooth core. In other words, the core element in the crash support portion has a part of the internal thread which—preferably on the thread flanks—is at least partially coated with the plastic or is enclosed by the plastic. As a result, in the region of the thread, the threaded element is positively supported via the support element on the core element relative to stress in the axial direction.

In an assembled adjustment drive mechanism, the core element protrudes with a support element inside the thread tooth into the thread space circulating in a helical manner of a screwed-in threaded spindle. If in the case of a crash, i.e. in the event of a vehicle collision, for example by a body striking against the steering wheel, an extremely high axial force is exerted on the adjustment drive mechanism, this so-called crash force acts axially in the direction of the threaded spindle axis between the internal thread and the threaded spindle. The thread teeth of the internal and external thread are subjected to correspondingly high shear stress. In this case the load acting on the plastic thread tooth of the threaded element is absorbed by the positive connection via the support element of the crash support portion and transmitted via the core element to the casing unit. The support element forms a reinforcing or strengthening element which prevents the thread tooth from shearing off and thus prevents the threaded spindle from slipping through the internal thread in the event of a crash.

A support element may extend from the core element into the thread tip of the thread tooth on the internal diameter of the internal thread and may be encapsulated with plastic on the thread flanks. As a result, a deep positive engagement in the external thread of a screwed-in threaded spindle is possible, whereby a significant supporting action is achieved in the axial direction. At least the thread flanks with the plastic surface of the plastic encapsulation are in contact with the external thread flanks of the threaded spindle which is generally manufactured from a metal material, preferably steel, whereby a smooth-running and low-friction adjustment is ensured.

The crash support portion may be arranged in an end region of the passage opening and the positioning portion may be arranged in the other end region opposite thereto. This constitutes a spatial and functional separation.

It may be provided that the internal thread has a larger core diameter at least in one part of the crash support portion. By the support element protruding at least partially into the thread tooth, by the greater strength of the core element the threaded element has a lower elastic deformability at that point than in a region in which at least the thread tooth and a circumferential region bearing this thread tooth are entirely configured from plastics. For example, the internal thread has a greater radial elasticity in an above-described positioning portion and/or a connecting portion. As a result, the thread may be screwed at that point onto the external thread of the threaded spindle with reduced play or without play, whereby it is possible for the adjustment drive mechanism to run in a manner which is without play and yet smoothly. In the region of the crash support portion the thread is inherently more rigid due to the support element, so that it is less flexible and could be less smooth-running in changing operating conditions, for example in the case of temperature fluctuations. This is effectively avoided by an enlarged core diameter of the internal thread, which leads to a greater thread play.

The core element may preferably be manufactured from a high-strength material which is at least greater than the strength of the plastic of the threaded element. Preferably, the core element may consist of a metal material, for example of steel, and the threaded element may consist of a thermoplastic material which is able to be processed by injection molding, for example of polypropylene (PP), polyoxymethylene (POM) or the like.

The ring gear may be molded externally onto the core element from a plastic as an injection molded plastic part. As a result, in the plastic injection-molding method a toothing with a material connection and/or positive connection, for example a worm toothing, may also be configured and connected in the same manufacturing step to the core element. In the connecting region with the ring gear, surface structures, protuberances, depressions, projections or similar positive connecting elements may also be configured on the core element, said positive connecting elements being embedded in the plastic of the ring gear so that a non-releasable positive connection with the core element is additionally produced. For example, a targeted roughening of the surface on the external circumference of the core element may also be carried out in order to optimize the adhesive action.

The thermoplastic material used may be adapted individually to the anticipated stresses of the threaded element and the ring gear during operation. Thus different plastics with different material properties may be used if required. Alternatively, it is conceivable to use the same plastic material in order to permit a more efficient manufacture.

It may be provided that the core element has integral bearing rings. The bearing rings form axial bearing surfaces which are arranged axially on both sides on the gear wheel and which preferably have raceways for rolling bodies, for example ball raceways of ball bearings. Rolling bodies are arranged between these ball raceways and corresponding ball raceways in axially or obliquely opposing external bearing surfaces which are fixed in the gear housing of the drive unit. As a result, a bearing arrangement is formed in which the gear wheel is mounted in the axial direction so as to be supported between two thrust bearings which in each case are formed from a bearing surface, an external bearing surface and the rolling bodies arranged therebetween. In this case, in particular, it is advantageous that the high forces occurring in the event of a crash are reliably transmitted from the crash support portion via the core element and the bearing surfaces. Moreover, an efficient manufacture is possible and a high degree of operating safety and functionality are provided.

In the case of an adjustment drive mechanism for a motor-adjustable steering column for a motor vehicle, comprising a gear wheel, a threaded spindle engaging in an internal thread of the gear wheel and a drive unit by which the gear wheel is rotatably drivable relative to the threaded spindle, it may be provided that the gear wheel is configured according to the embodiments according to the invention described above. The drive unit has, for example, a gear element, for example a worm, meshing with the ring gear. The use of a gear wheel according to the invention permits a more efficient manufacture and provides greater operating safety, in particular even under high stress and in the case of a crash.

It is advantageous that in the case of a motor-adjustable steering column for a motor vehicle, comprising an adjustment drive mechanism which is arranged between a support unit which may be connected to the vehicle body and a casing unit rotatably receiving a steering spindle and/or between casing tubes of a casing unit which are axially adjustable in a telescopic manner relative to one another and which bear the steering spindle, the adjustment drive mechanism is configured as described above with a gear wheel according to the invention. As a result, a more efficient manufacture is possible, and greater operational safety, in particular even under high stress and in the case of a crash.

Figure 1:
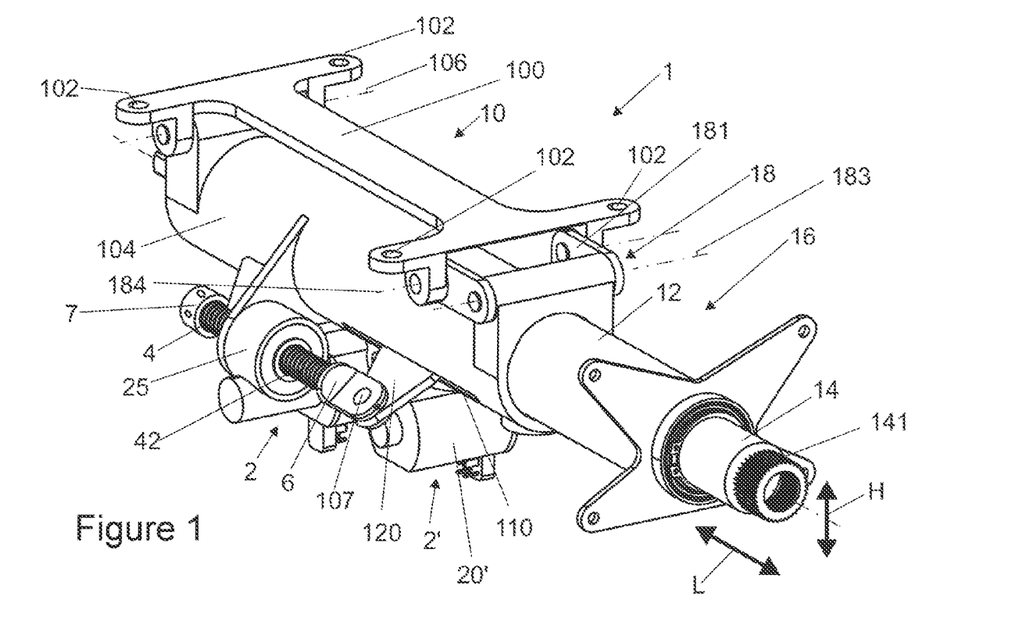
FIG. 1 is a schematic perspective view of a steering column with a motorized adjustment.

FIG. 1 shows a steering column 1 which has a support unit 10 which is able to be connected to the body of a motor vehicle, not shown here, on which an actuating unit 16 is adjustably retained and namely in the longitudinal direction L and in the vertical direction H as indicated by the double arrows. The support unit 10 comprises a bracket 100 which may be fastened to the chassis of the motor vehicle, for example via fastening bores 102.

The actuating unit 16 comprises a casing tube 12 in which a steering spindle 14 is rotatably mounted. A steering wheel, not shown here, may be fastened to the end 141 of the steering spindle 14 on the steering wheel side. The steering spindle 14 serves to transmit a steering torque introduced by a driver via the steering wheel to the steering spindle 14 in the known manner onto a steerable wheel, not shown here. The steering spindle 14 in this case may transmit the steering movement from the steering wheel onto the steerable wheel by the interposition of a steering gear, optionally with the aid of power assistance.

In a variant, the steering movement from the steering spindle 14 may also be detected by sensor, for example electrically, electronically or magnetically and fed into a control system which performs with the aid of a steering device a pivoting of the steerable wheel to constitute the steering movement. Such systems are known as steer-by-wire steering systems.

The casing tube 12 is displaceably retained in a casing unit 104 in the longitudinal direction L which is the longitudinal adjustment direction, wherein the longitudinal direction L extends in the axial direction of the steering spindle 14. By an adjustment of the casing tube 12 relative to the casing unit 104 correspondingly a longitudinal adjustment of the steering spindle 14 may be achieved and thus of the steering wheel, not shown, for adapting the position of the steering wheel to the seating position of a driver of the motor vehicle.

The casing unit 104 is pivotably fastened to a bracket 100 and may be pivoted about a pivot axis 106 relative to the bracket 100. An adjustability of the actuating unit 16 in the vertical direction H, i.e. the vertical adjustment direction, which is oriented substantially perpendicular to the longitudinal direction L, is permitted by the casing tube 12 being retained on the bracket 100 by a pivoting mechanism 18. Thus a pivotability of the casing tube 12 and the steering spindle 14 relative to the support unit 10 and in particular relative to the bracket 100 about the pivot axis 106 is produced such that a vertical adjustment of the steering wheel, not shown here and arranged on the steering spindle 14, is also achieved, in order to achieve in this manner an adaptation of the position of the steering wheel to the seating position of the driver.

In the exemplary embodiment, a separate adjustment drive mechanism 2, 2' is provided for each of the two adjusting directions, with in each case a separate spindle drive comprising a threaded spindle 4, 4' and a gear wheel 3.

An adjustment drive mechanism 2 is provided, by which the actuating unit 16 may be adjusted relative to the support unit 10 in the longitudinal direction L. The adjustment drive mechanism 2 comprises a threaded spindle 4 which has an external thread 42 and via a fastening element 107, which is configured as an articulated pin, is connected to the link lever 120 which is connected to the casing tube 12. The link lever 120 is displaceably guided in a slot 110 in the casing unit 104 such that a displacement of the link lever 120 relative to the casing unit 104 leads to a displacement of the actuating unit 16 relative to the support unit 10 in the longitudinal direction L.

The threaded spindle 4 is retained via a coupling element 6, which is configured as a joint head 43, on the link lever 120 and extends with its spindle axis S in the longitudinal direction L. The threaded spindle 4 engages with its external thread 42 in an internal thread 32 of a gear wheel 3, i.e. is screwed therein. The gear wheel 3 is rotatably mounted in a gear housing 25 but fixed in the longitudinal direction L relative to the casing unit 104 so that a rotation of the gear wheel 3 leads to an axial movement of the threaded spindle 4 relative to the gear wheel 3 in the direction of the spindle axis S. In other words, by a rotation of the gear wheel 3 a relative movement between the casing tube 12 and casing unit 104 takes place such that an adjustment of the position of the actuating unit 16 relative to the support unit 10 is effected.

The adjustment drive mechanism 2 further comprises a drive motor 20, a worm 22 being arranged on the output shaft 24 thereof. The worm 22 engages in the toothing 30 of the gear wheel 3 which is configured as a worm wheel. The gear wheel 3 is rotatably mounted about the spindle axis S in a bearing 23 in the gear housing 25. The rotational axis of the worm 22 and the spindle axis S of the gear wheel 3 are perpendicular to one another, as is known per se from worm gears.

Accordingly, the gear wheel 3 may be rotated by a rotation of the output shaft 24 of the drive motor 20, whereby a longitudinal adjustment of the actuating unit 16 in the longitudinal direction L takes place relative to the casing unit 104 and thus a longitudinal displacement of the actuating unit 16 takes place relative to the support unit 10.

Figure 2:
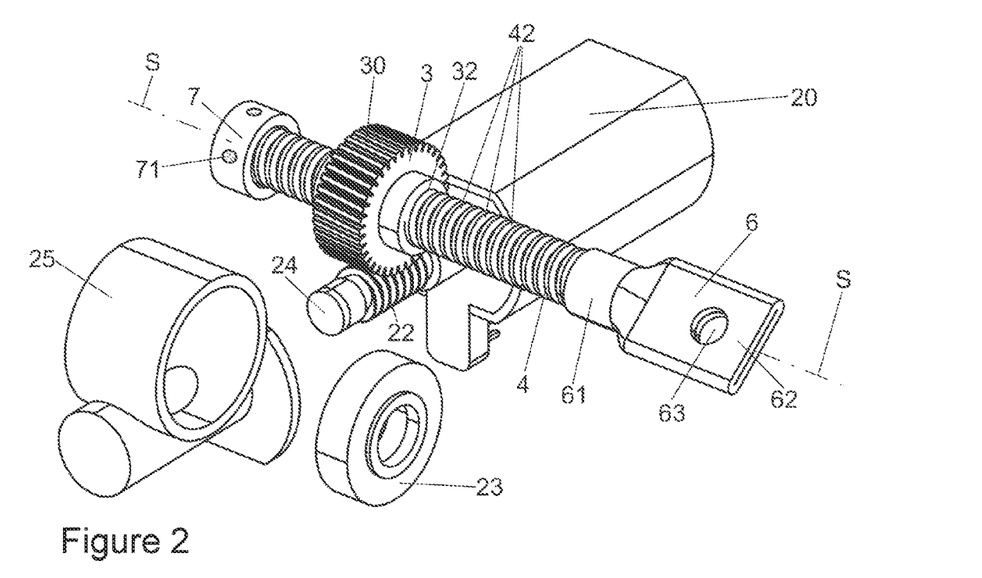
FIG. 2 is an exploded view an adjustment drive mechanism of the steering column according to FIG. 1.

FIG. 2 shows an exploded view of the adjustment drive mechanism 2. Clearly visible is the threaded spindle 4, the coupling element 6 being fixedly attached to the one end thereof. At the other end a stop element 7 formed from plastic is fixedly attached to the threaded spindle 4, wherein the stop element 7 is fixed to the threaded spindle 4 by partial plastic deformations in the form of indentations 71 which are incorporated by means of hot caulking and/or thermal caulking. Alternatively, the stop element 7 may also be formed from a metal material, said stop element being fixed to the threaded spindle by partial plastic deformations.

Figure 3:
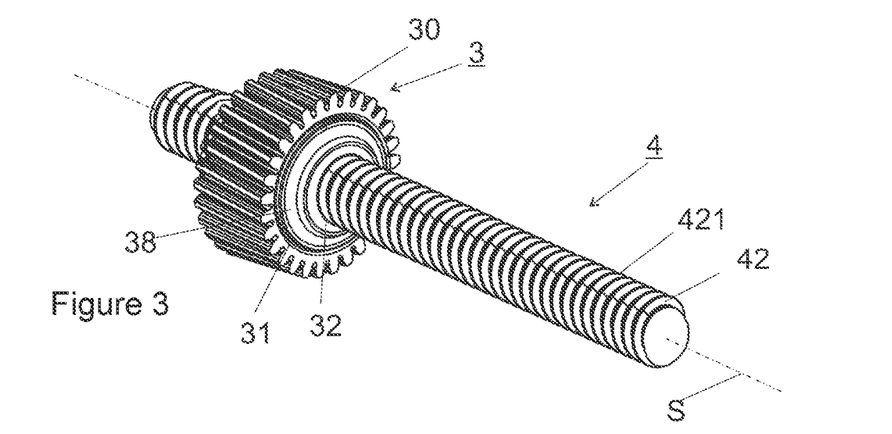
FIG. 3 is a perspective view of an arrangement of a gear wheel in an adjustment drive mechanism with an engaging threaded spindle.
Figure 4:
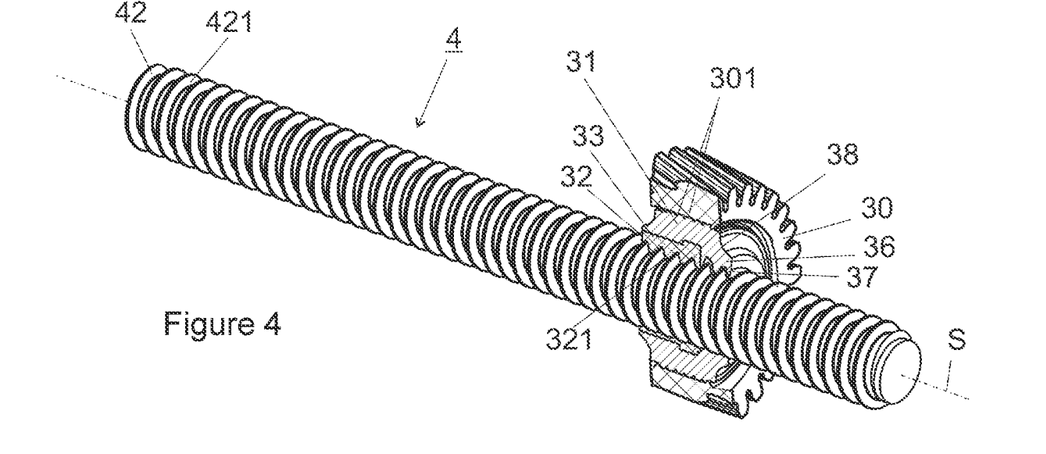
FIG. 4 is the arrangement according to FIG. 3 with the gear wheel shown cut away.
Figure 5:
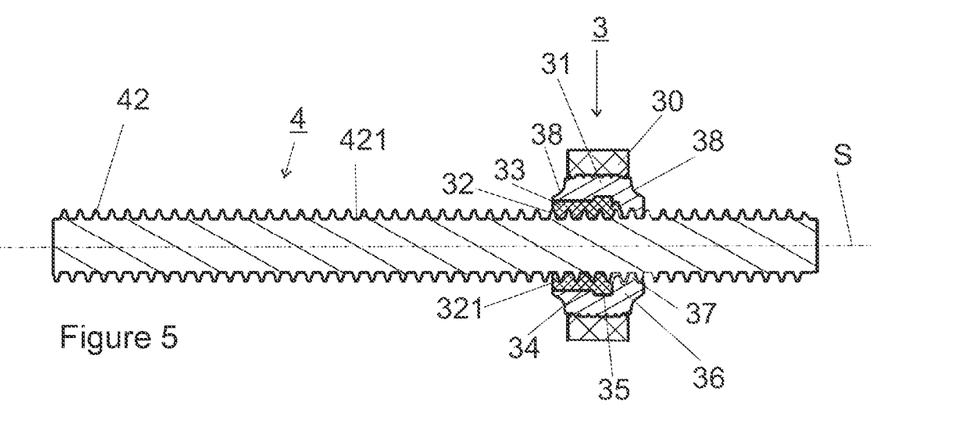
FIG. 5 is a longitudinal section through an arrangement according to FIG. 3 or 4.
Figure 6:
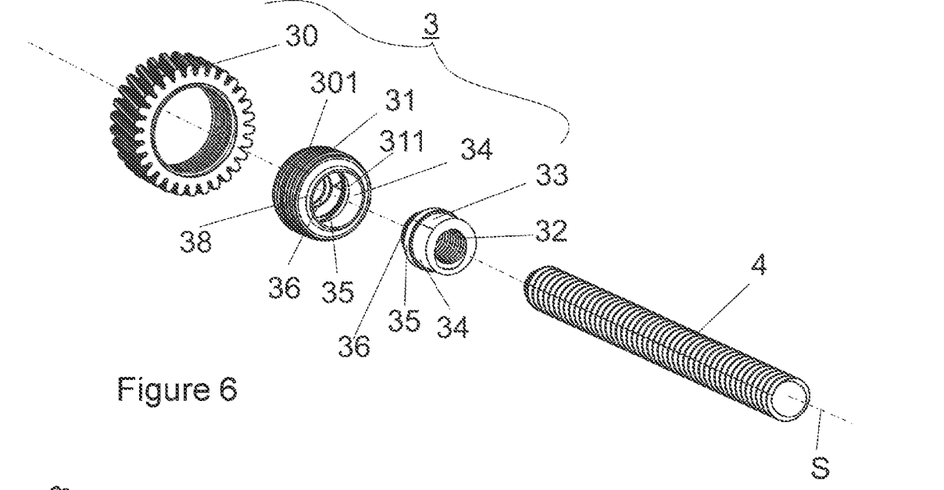
FIG. 6 is a schematic exploded view of the arrangement according to FIG. 3, 4, or 5.
Figure 7:
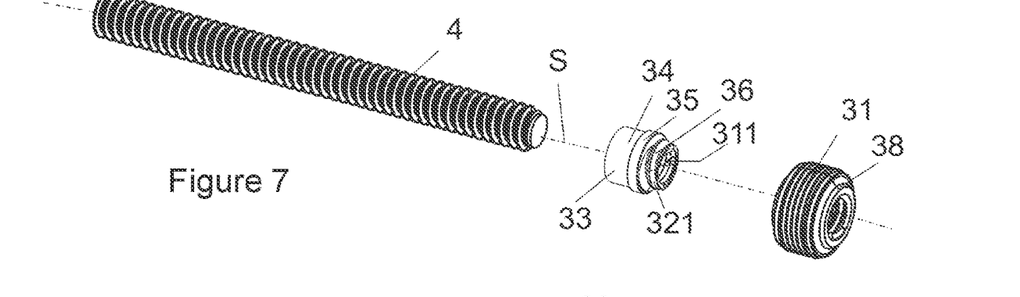
FIG. 7 is a further schematic exploded view of the arrangement according to FIGS. 3, 4, 5, and 6 without a ring gear.
Figure 9:
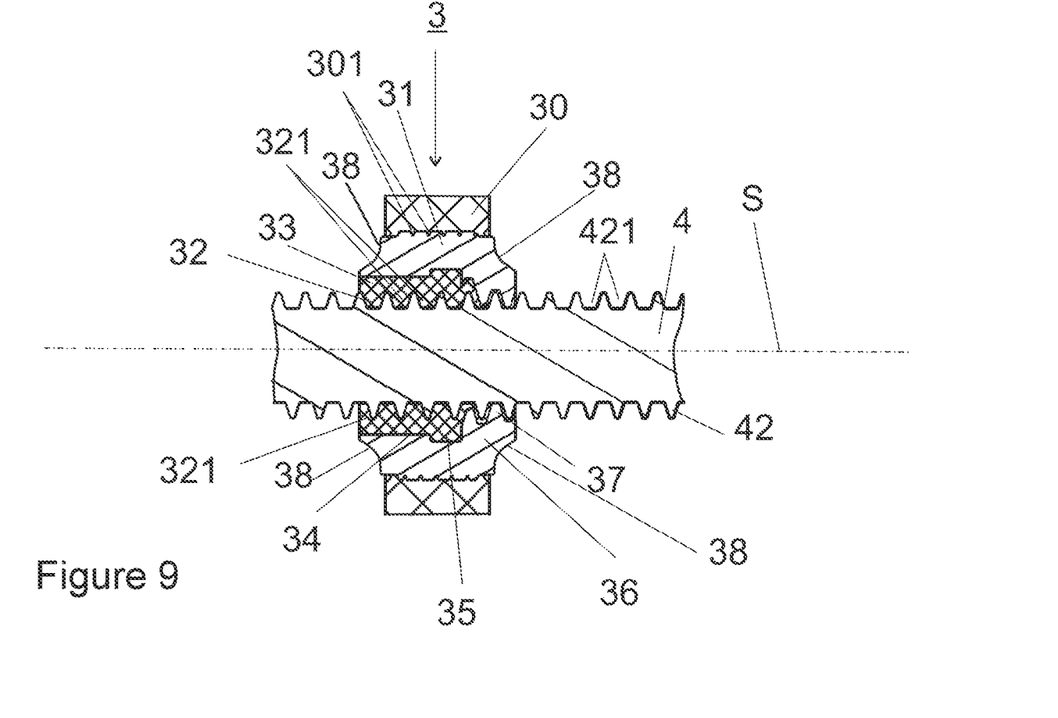
FIG. 9 is an enlarged detailed view of FIG. 5.

FIGS. 3, 4 and 5 show the spindle drive of an adjustment drive mechanism 2 formed from the gear wheel 3 and the threaded spindle 4 engaging therein, as shown for example in FIGS. 1 and 2. FIG. 9 shows an enlarged detail of the longitudinal section along the spindle axis S of FIG. 5 through the gear wheel 3. In FIG. 6 and FIG. 7 the gear wheel 3 is shown schematically in an exploded view.

In the sectional views of FIGS. 4, 5 and 9 it may be identified that the gear wheel 3 has a core element 31 which preferably consists of steel. An internal thread 32 is configured in a threaded element 33 which is coaxially fixed in an axial passage opening 311 of the core element 31. The threaded element 33 consists of a thermoplastic material and is injection-molded into the core element 31 in a plastic injection-molding method.

The internal thread 32 in the example is configured as a single-start thread and thus has a helically circulating thread tooth 321 which engages in a circumferential thread space 421 of the external thread 42 of the threaded spindle 4.

The toothing in the example is formed by a ring gear 30 made of thermoplastic material which is injection-molded in a plastic injection-molding method externally on the core element 31. For producing a particularly load-bearing positive connection, the core element 31 on its external circumference has positive connecting elements 301 in the form of grooves or projections which are embedded in the plastic of the ring gear 30.

In the passage opening 311 the core element 31 has a positioning portion 34 in which the inner wall is configured to be internally cylindrical and smooth. The internal diameter of the passage opening 311, which corresponds to the external diameter of the threaded element 33, in the positioning portion 34 is larger than the external diameter of the internal thread 32. The plastic injection-molded into the positioning portion 34 adheres by a material connection to the cylindrical inner wall, wherein the dimensional accuracy of the thread tooth 321 is ensured by the smooth inner wall and the rotationally symmetrical orientation to the internal thread 32.

A connecting portion 35 adjoins the positioning portion 34 in the axial direction—to the right in FIGS. 4, 5 and 9. The connecting portion 35 has a groove-like recess which is integrally formed radially from the inside in the passage opening 311 and which has a larger internal diameter relative to the positioning portion 34, and as a result is configured as an undercut. Accordingly, the plastic in the connecting portion 35 produces a positive, non-releasable fixing of the threaded element 33 in the core element 31 in the axial direction. The inner wall in the connecting portion 35 may also be configured to circulate in a smooth and cylindrical manner in the circumferential direction in order to avoid potentially disadvantageous sink marks and stresses when the plastic solidifies.

Moreover, the core element 31 has a crash support portion 36 in which an integrally formed support element 37 protrudes radially inwardly into the thread tooth 321. The support element 37 is configured to circulate in a helical manner with the pitch of the thread 32 and forms—to the right in the figures—a thread projection which tapers conically inwardly. It may be clearly identified that the support element 37 radially penetrates into the circumferential thread space 421 of the threaded spindle 42. As a result, an effective positive connection is formed in the axial direction even if, due to extremely high stress as may occur in the event of a crash, the thread tooth 321 which is configured entirely from plastic in the positioning portion 34 is deformed or sheared off. Preferably on the thread flanks, the thread tooth 321 is also encapsulated at least partially with plastic in the crash support portion 36, as may be identified in FIGS. 8 and 9.

In the crash support portion 36 the internal thread 32 may have a larger internal diameter relative to the positioning portion 34, so that a greater radial play is present at that point in the thread between the threaded spindle 4 and the internal thread 32.

As shown, the connecting portion 35 may be preferably arranged between the positioning portion 34 and the crash support portion 36.

FIG. 6 shows a schematic exploded view of the individual elements of the gear wheel 3 which are normally non-releasably connected together. In this case, for clarification the positioning portion 34, the connecting portion 35 and the crash support portion 36 are correspondingly denoted on the threaded element 33 and on the core element 31. FIG. 7 shows a further schematic exploded view of the individual elements—but without a ring gear—in particular of the threaded element 33. It may be derived therefrom that not only the internal thread 32 has a thread tooth 321 but that one or more threads made of plastic are formed in the region of the support element 37 externally on the crash support portion 36.

Figure 8:
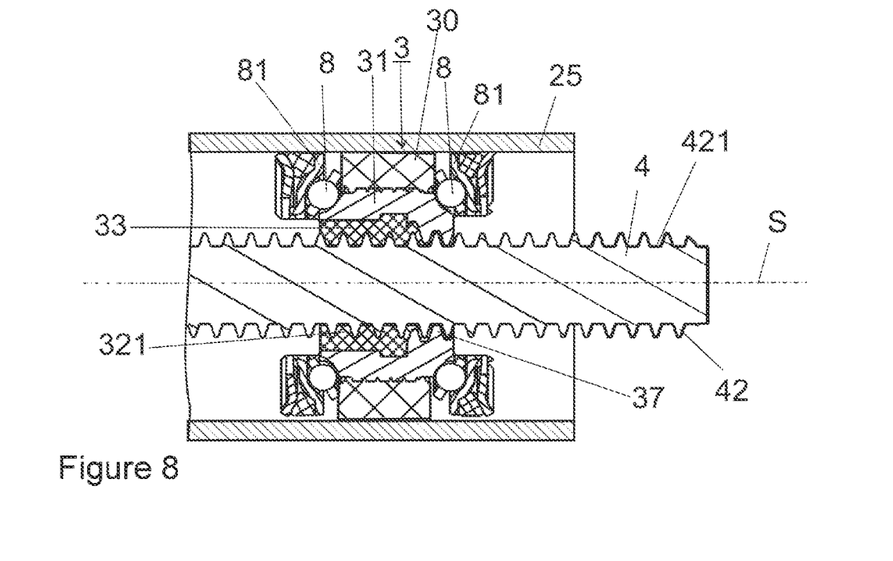
FIG. 8 is a longitudinal section through a bearing arrangement of an adjustment drive mechanism according to FIG. 1 or 2.

Circumferential bearing rings 38 are formed in the core element 31 on both axial front faces, said circumferential bearing rings forming integrally formed raceways for rolling bodies, for example balls 8. In a bearing arrangement as shown in FIG. 8, corresponding bearing rings 81 obliquely opposing the bearing rings 38 are fixed in the gear housing 25 in order to form oblique thrust bearings. The gear wheel 3 is roller-mounted on both sides between the ball bearings formed from the bearing rings 38 and 81 together with the balls 8.

LIST OF REFERENCE NUMERALS

1 Steering column
10 Support unit
12 Casing tube
14 Steering spindle
141 End on steering wheel side
16 Actuating unit
18 Pivoting mechanism
100 Bracket
102 Fastening bore
104 Casing unit
106 Pivot axis
107 Fastening element
110 Slot
120 Link lever
181 Actuating lever
182 Joint
183 Joint axis
184 Joint axis
2, 2' Adjustment drive mechanism
20,20' Drive motor
22 Worm
23 Bearing
24 Output shaft
25 Gear housing
3 Gear wheel
30 Toothing
31 Core element
311 Passage opening
32 Internal thread
321 Thread tooth
33 Threaded element
34 Positioning portion
35 Connecting portion
36 Crash support portion
37 Support element
38 Bearing ring
4, 4' Threaded spindle
42 External thread
421 Thread space
43 Joint head
7 Stop element
71 Indentations
8 Ball
81 Bearing ring

What is claimed is:

1. A gear wheel for an adjustment drive mechanism, comprising:
    a ring gear,
    a core element attached coaxially circumferentially to the inside of the ring gear, the core element including an axial passage opening, and
    a threaded element fitted to the passage opening, the threaded element having an axially continuous internal helical thread,
    wherein the threaded element is comprised of a plastic material that is disposed on an inner wall of the passage opening of the core element, wherein the threaded element is disposed radially within the core element at a midpoint of an axial extent of the core element.

2. The gear wheel of claim 1 wherein the passage opening has at least one smooth, cylindrical positioning portion.

3. The gear wheel of claim 2 comprising a crash support portion configured in the passage opening, at least one support element protruding from the core element into a thread tooth in said crash support portion.

4. The gear wheel of claim 3 wherein the crash support portion is arranged in an end region of the passage opening and the positioning portion is arranged in an opposite end region.

5. The gear wheel of claim 3 wherein a connecting portion is arranged between the positioning portion and the crash support portion.

6. The gear wheel of claim 3 wherein an internal thread has a larger core diameter at least in one part of the crash support portion.

7. The gear wheel of claim 1 the axial passage opening comprises an undercut connecting portion.

8. The gear wheel of claim 1 wherein the ring gear is molded externally onto the core element as a plastic part.

9. The gear wheel of claim 1 wherein the core element has integral bearing rings.

10. The gear wheel of claim 1 wherein the threaded element is disposed entirely within the core element such that no portion of the threaded element protrudes axially from the core element.

11. The gear wheel of claim 1 wherein the core element is comprised of a metal that is stronger than a material of the threaded element and stronger than a material of the ring gear, wherein the core element supports and stabilizes both the threaded element and the ring gear.

12. The gear wheel of claim 1 wherein a first axial portion of the core element extends farther radially inward than a second axial portion of the core element, wherein a support element at the first axial portion is configured to engage a threaded spindle.

13. The gear wheel of claim 12 wherein the threaded element is disposed at the first axial portion of the core element and is not disposed at the second axial portion of the core element.

14. The gear wheel of claim 12 wherein internal teeth of the support element are at least partially coated with plastic or enclosed with plastic.

15. The gear wheel of claim 13 wherein the threaded element is configured to engage the threaded spindle at an axial location that is adjacent to the support element.

16. The gear wheel of claim 1 wherein the ring gear, the core element, and the threaded element are concentric with respect to a longitudinal axis, wherein the ring gear, the core element, and the threaded element occupy a plane that is normal to the longitudinal axis.

17. The gear wheel of claim 1 wherein the ring gear and the threaded element are disposed about a longitudinal axis that extends through the axial passage opening of the core element, wherein the ring gear and the threaded element occupy a plane that is normal to the longitudinal axis.

18. The gear wheel of claim 1 wherein the threaded element includes a connecting portion that extends radially outward farther than a remainder of the threaded element, wherein the connecting portion is seated in a groove of the core element such that the connecting portion and the groove are disposed at a same axial location.

19. An adjustment drive mechanism for a motor-adjustable steering column for a motor vehicle, comprising:
   a gear wheel,
   a threaded spindle engaging in an internal thread of the gear wheel, and
   a drive unit by which the gear wheel is rotatably drivable relative to the threaded spindle,
   wherein the gear wheel comprises:
      a ring gear,
      a core element attached coaxially circumferentially to the inside of the ring gear, the core element including an axial passage opening, and
      a threaded element fitted to the passage opening, the threaded element having an axially continuous internal helical thread,
   wherein the threaded element is comprised of plastic and is disposed on an inner wall of the passage opening such that at least a majority of an axial extent of the threaded element overlaps axially with the core element.

20. A motor-adjustable steering column for a motor vehicle, comprising:
   the adjustment drive mechanism of claim 19, which is arranged between a support unit which is configured to connect to the vehicle body, and
   a casing unit rotatably receiving a steering spindle and/or between casing tubes of a casing unit which are axially adjustable in a telescopic manner relative to one another and which bears the steering spindle.

* * * * *